(12) United States Patent
Hsiao

(10) Patent No.: US 6,697,179 B2
(45) Date of Patent: Feb. 24, 2004

(54) MULTI-LAYER HOLOGRAM LABEL

(75) Inventor: Tsung-Ming Hsiao, Tainan (TW)

(73) Assignee: K Laser Technology Inc., Hsinchu (TW)

( * ) Notice: Subject to any disclaimer, the term of this patent is extended or adjusted under 35 U.S.C. 154(b) by 0 days.

(21) Appl. No.: 10/192,570

(22) Filed: Jul. 9, 2002

(65) Prior Publication Data

US 2004/0008390 A1 Jan. 15, 2004

(51) Int. Cl.⁷ .................................................. G03H 1/00
(52) U.S. Cl. ...................... 359/2; 430/1; 430/2; 283/86; 283/94
(58) Field of Search ............................... 359/2; 283/86, 283/94, 72, 101; 430/1, 2, 321; 235/457, 462.34

(56) References Cited

U.S. PATENT DOCUMENTS 5,411,296 A * 5/1995 Mallik ........................... 283/86
6,087,075 A * 7/2000 Kler ............................. 430/321

* cited by examiner

Primary Examiner—Drew Dunn
Assistant Examiner—Leo Boutsikaris
(74) Attorney, Agent, or Firm—Pro-Techtor International Services

(57) ABSTRACT

A multi-layer hologram label includes a base layer having a surface on which a number of layers of adhesive materials are coated in a stacked manner. Each layer has a surface on which a pattern associated with a holographic image is formed whereby by sequentially removing the layers, the patterns of the next layers are sequentially exposed for displaying the associated holographic image. The layers of adhesive materials can be replaced by hologram films carrying hologram patterns thereon. By sequentially removing the hologram films, the hologram patterns of the next films are sequentially exposed to display holographic images associated therewith.

10 Claims, 19 Drawing Sheets

MULTI-LAYER HOLOGRAM LABEL

BACKGROUND OF THE INVENTION

1. Field of the Invention

The present invention relates generally to a hologram label for anti-counterfeit, and in particular to a hologram label having a multiplicity of hologram films for excellent security of anti-counterfeit.

2. The Related Art

Hologram labels have been widely used in a variety of applications, such as packages and anti-counterfeit labels used in music and video discs and credit cards. However, since the holographic technology has been developed well, counterfeit of the hologram label itself becomes readily possible. This makes anti-counterfeit of products by means of hologram labels becomes very difficult. Furthermore, most of the hologram labels for anti-counterfeit purposes are attached to the authentic products by adhesives. The way of adhering anti-counterfeit labels to the authentic products allows the anit-counterfeit labels to be removed from the authentic product and re-attached to a counterfeited product. The purposes of anti-counterfeit of the hologram labels are completely ruined.

It is thus desired to provide a hologram label for excellent anti-counterfeit in order to overcome the above problems.

SUMMARY OF THE INVENTION

An object of the present invention is to provide a hologram label for excellent anti-counterfeit.

Another object of the present invention is to provide a hologram label comprising a multiplicity of hologram films stacked together for improved anti-counterfeit purpose.

A further object of the present invention is to provide a hologram label having a multiplicity of hologram layers, each layer being made of a destructive material to avoid the label to be removed from an authentic product and re-attached to a counterfeit product.

To achieve the above objects, in accordance with the present invention, there is provided a multi-layer hologram label comprising a base layer having a surface on which a number of layers of adhesive materials are coated in a stacked manner. Each layer has a surface on which a pattern associated with a holographic image is formed whereby by sequentially peeling and removing the layers, the patterns of the next layers are sequentially exposed for displaying the associated holographic image. The layers of adhesive materials can be replaced by hologram films carrying hologram patterns thereon. By sequentially removing the hologram films, the hologram patterns of the next films are sequentially exposed to display holographic images associated therewith.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1A:
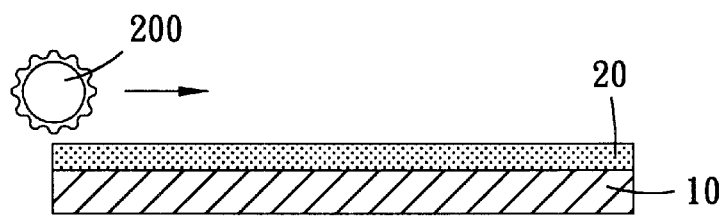
FIGS. 1A–1F respectively show a process for making a multi-layer hologram label in accordance with a first embodiment of the present invention and the hologram label so made.
Figure 1B:
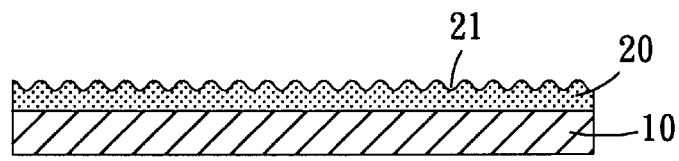

With reference to the drawings and in particular to FIGS. 1A–1F, a multi-layer hologram label constructed in accordance with a first embodiment of the present invention, generally designated with reference numeral 100, comprises a base layer 10 having a first surface (not labeled) on which first, second and third layers 20, 30, 40 of adhesive materials are formed in a stacked form. The base layer 10 can be made of any suitable material, such as polyethylene (PE), polypropylene (PP), polyethylene terephthalate (PET) and polyvinyl chloride (PVC), but not limited thereto. The adhesive materials of the first, second and third layers 20, 30, 40 are preferably resin based material or ultraviolet curable resin based material.

The first layer 20 is coated on the first surface of the base layer 10 and is further processed by a first pattern forming wheel 200 carrying a first pattern of hologram as shown in FIG. 1A. A first pattern 21 for the formation of a first hologram is thus formed on the first layer 20 by the pattern forming wheel 200, FIG. 1B.

Figure 1C:
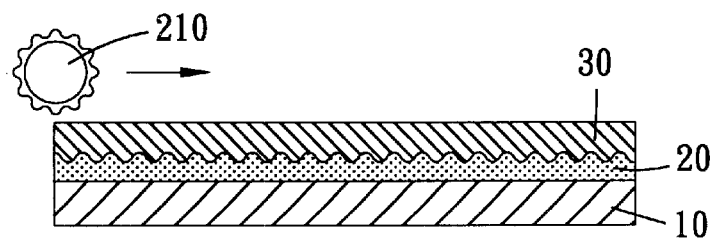
Figure 1D:
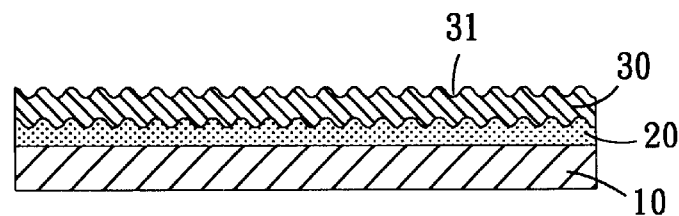

The second layer 30 is then formed on the first pattern 21 of the first layer 20 and is further processed by a second pattern forming wheel 210 carrying a second pattern of hologram as shown in FIG. 1C. A second pattern 31 for the formation of a second hologram is thus formed on the second layer 30 by the second pattern forming wheel 210, FIG. 1D.

Figure 1E:
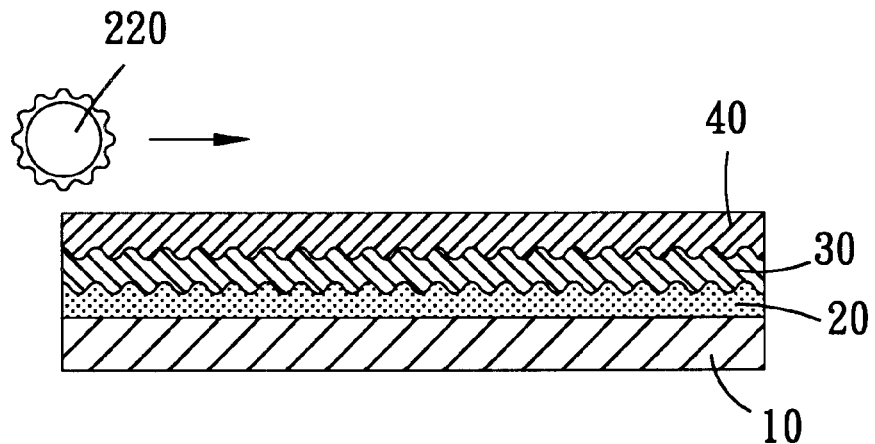
Figure 1F:
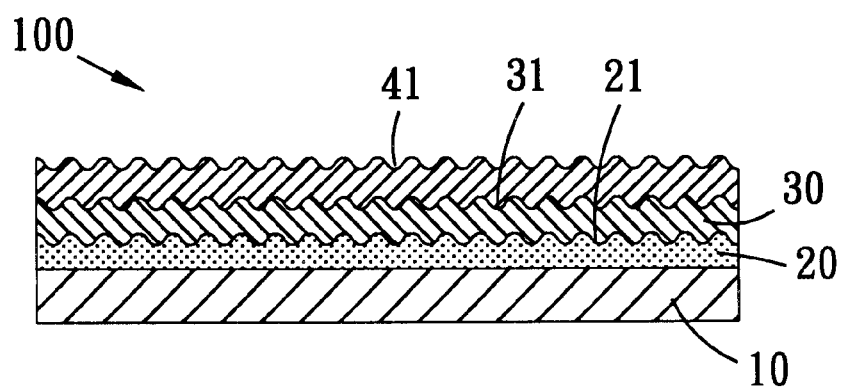

The third layer 40 is then formed on the second pattern 31 of the second layer 30 and is further processed by a third pattern forming wheel 220 carrying a third pattern of hologram as shown in FIG. 1E. A third pattern 41 for the formation of a third hologram is thus formed on the third layer 40 by the third pattern forming wheel 220, FIG. 1F. Although the first, second and third patterns 21, 31, 41 can be identical to each other, it is preferred that they are different from each other whereby the hologram label 100 so made comprises three layers of different holograms which display three different holographic images. An application of the multi-layer hologram label 100 will be described hereinafter with reference to FIGS. 5A–5C.

Figure 2A:
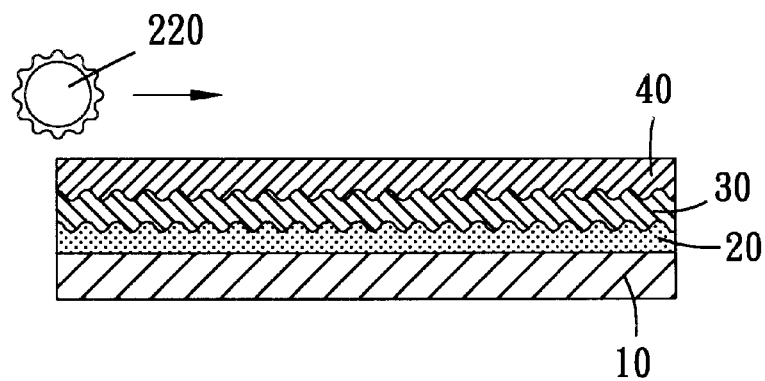
FIGS. 2A–2C respectively show a process for making a multi-layer hologram label in accordance with a second embodiment of the present invention and the hologram label so made.
Figure 2B:
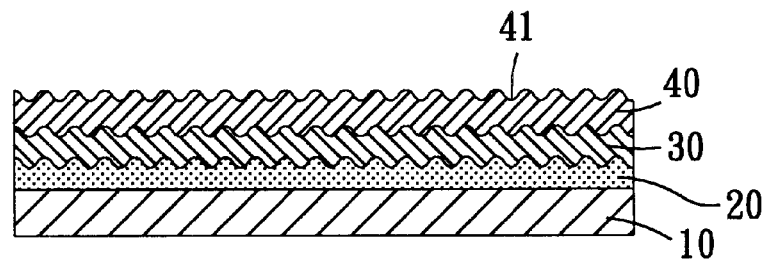
Figure 2C:
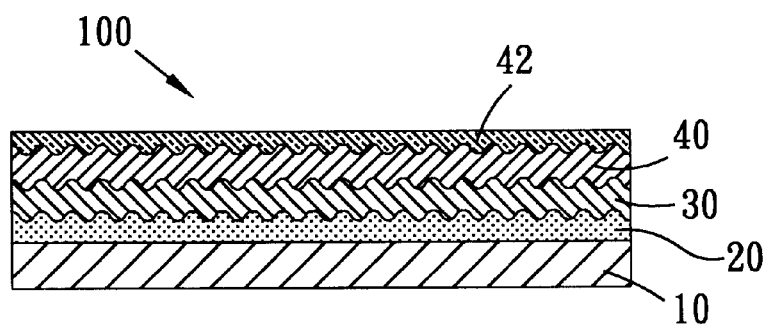
Figure 3A:
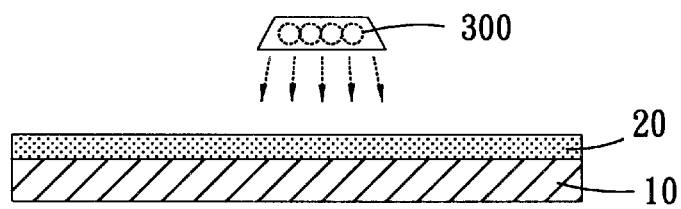
FIGS. 3A–3F respectively show a process for making a multi-layer hologram label in accordance with a third embodiment of the present invention and the hologram label so made.
Figure 3B:
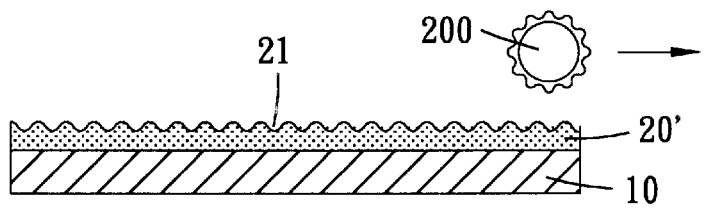
Figure 3C:
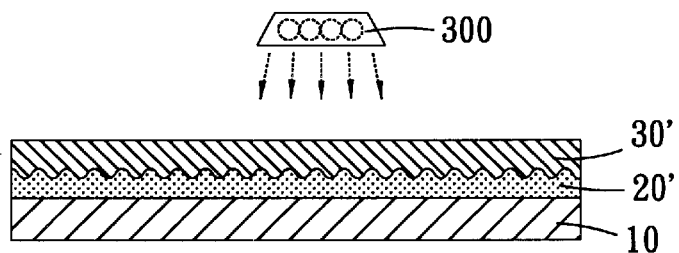
Figure 3D:
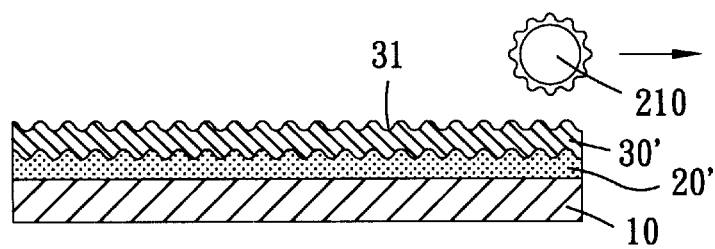
Figure 3E:
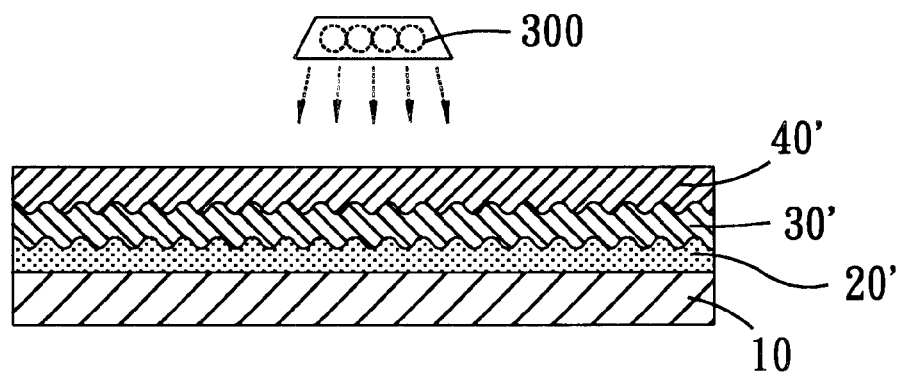
Figure 3F:
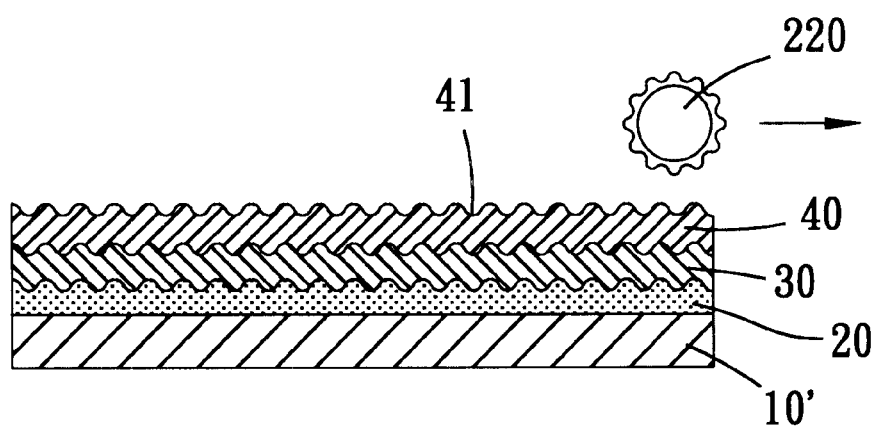

FIGS. 2A–2C show a multi-layer hologram label constructed in accordance with a second embodiment of the present invention, also designated with reference numeral 100 for simplicity. The multi-layer label 100 of the second embodiment is substantially identical to the multi-layer label 100 of the first embodiment, comprising a base layer 10 having a first surface (not labeled) on which first, second and third layers 20, 30, 40 of adhesive materials are formed in a stacked form. First, second, and third hologram patterns are respectively formed on the first, second and third layers 20, 30, 40. FIGS. 2A and 2B respectively show the same steps of FIGS. 1E and 1F wherein the third layer 40 and the third pattern 41 made by means of the third pattern forming wheel 220 are respectively formed. In accordance with the second embodiment of the present invention, a protective layer 42 is further formed on the third pattern 41 of the third layer 40, FIG. 2C. The protective layer 42 is made of an opaque resin in order to hide the hologram of the third pattern 41. The hologram of the multi-layer hologram label 100 of the second embodiment is thus in a hidden condition in general use. The protective layer 42 can be removed to show the third pattern 41 and thus displaying a holographic image associated with the third pattern 41 to an observer for authentication. The removal of the protective layer 42 destroys the label 100 and recovery is impossible.

FIGS. 3A–3F show a multi-layer hologram label constructed in accordance with a third embodiment of the present invention, also designated with reference numeral 100 for simplicity. The multi-layer label 100 of the third embodiment is substantially identical to the multi-layer label 100 of the first embodiment, comprising a base layer 10 having a first surface (not labeled) on which first, second and third layers 20', 30', 40' of adhesive materials are formed in a stacked form. First, second, and third patterns 21, 31, 41 are respectively formed on the first, second and third layers 20', 30', 40' by means of first, second and third pattern forming wheels 200, 210, 220 for the formation of associated holograms. However, in the third embodiment illustrated, the first, second and third layers 20', 30', 40' are made of ultraviolet curable resins. The layers 20', 30', 40' are respectively cured by an ultraviolet source 300 (FIGS. 3A, 3C and 3E) before being processed by the first, second, third pattern forming wheels 200, 210, 220. The cured layers 20', 30', 40' are processed by the first, second, third pattern forming wheels 200, 210, 220 in a heat-pressing manner to form the first, second, third patterns 21, 31, 41. The patterns 21, 31, 41 so formed are more concrete and distinctive as compared to those of the first and second embodiments.

Figure 4A:
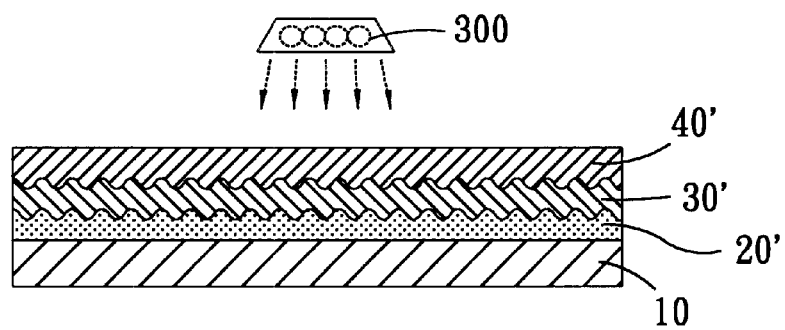
FIGS. 4A–4C respectively show a process f or making a multi-layer hologram label in accordance with a fourth embodiment of the present invention and the hologram label so made.
Figure 4B:
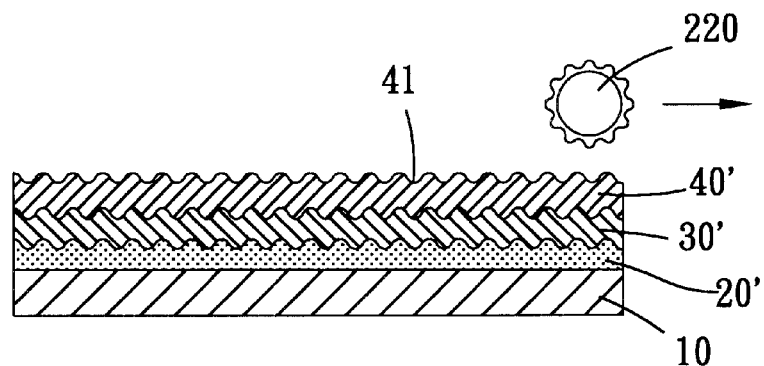
Figure 4C:
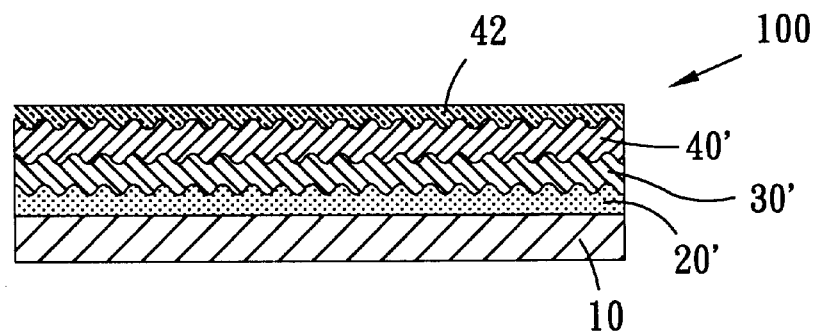

FIGS. 4A–4C show a multi-layer hologram label constructed in accordance with a fourth embodiment of the present invention, also designated with reference numeral 100 for simplicity. The multi-layer label 100 of the fourth embodiment is substantially identical to the multi-layer label 100 of the third embodiment, comprising a base layer 10 having a first surface (not labeled) on which first, second and third layers 20', 30', 40' of ultraviolet curable resins are formed in a stacked form. First, second, and third hologram patterns are respectively formed on the first, second and third layers 20', 30', 40'. FIGS. 4A and 4B respectively show the same steps as those of FIGS. 3E and 3F wherein the third layer 40' and the third pattern 41 made by means of the third pattern forming wheel 220 are respectively formed. In accordance with the fourth embodiment of the present invention, a protective layer 42 is further formed on the third pattern 41 of the third layer 40', FIG. 4C, for hiding the hologram of the third pattern 41. The hologram of the multi-layer hologram label 100 of the fourth embodiment is thus in a hidden condition in general use. Removing the protective layers shows the third pattern 41 and display the holographic image associated therewith but damages the label 100 itself. Re-use of the label 100 is thus impossible.

Figure 5A:
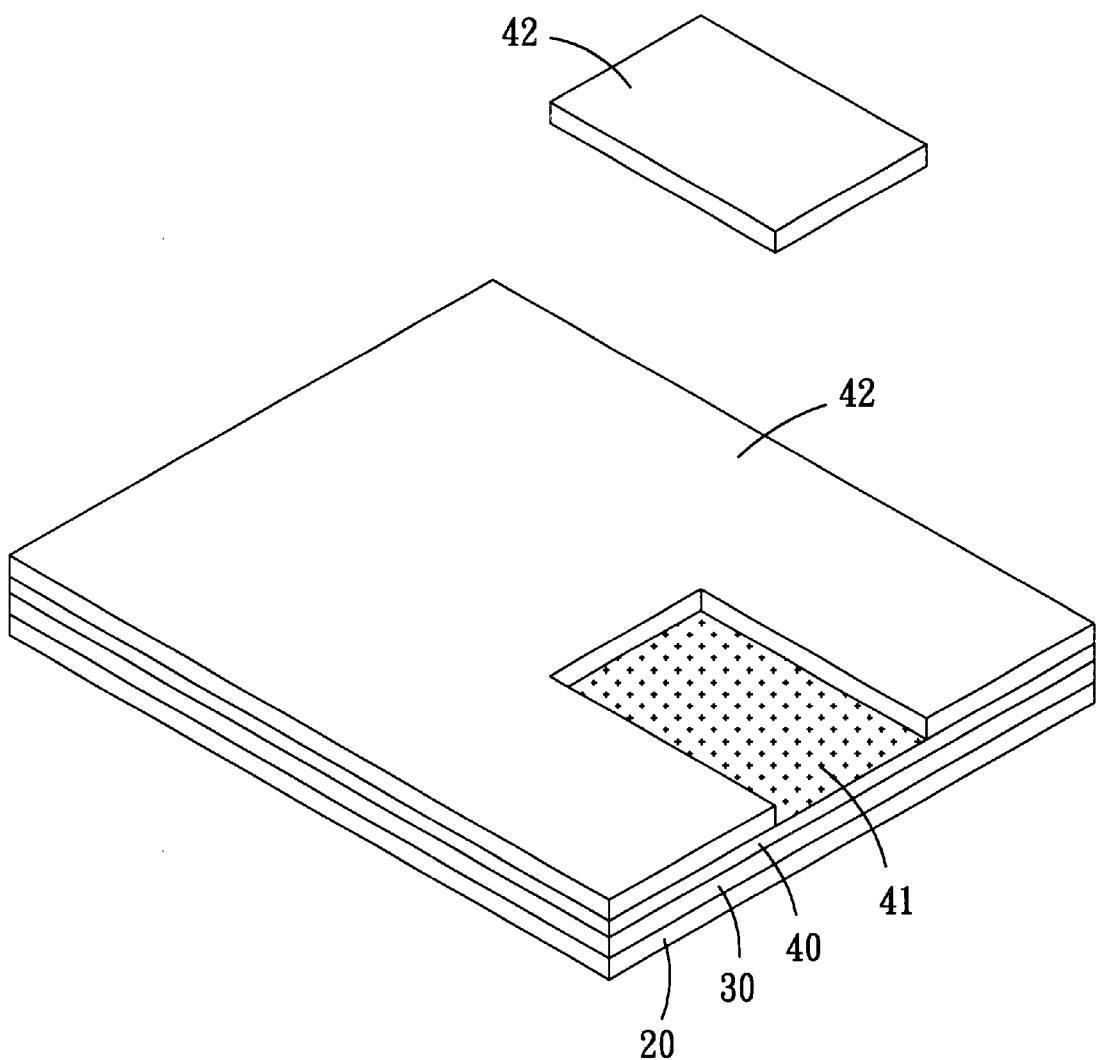
FIGS. 5A–5C are perspective views of a multi-layer hologram label of the present invention with different layers being removed sequentially.
Figure 5B:
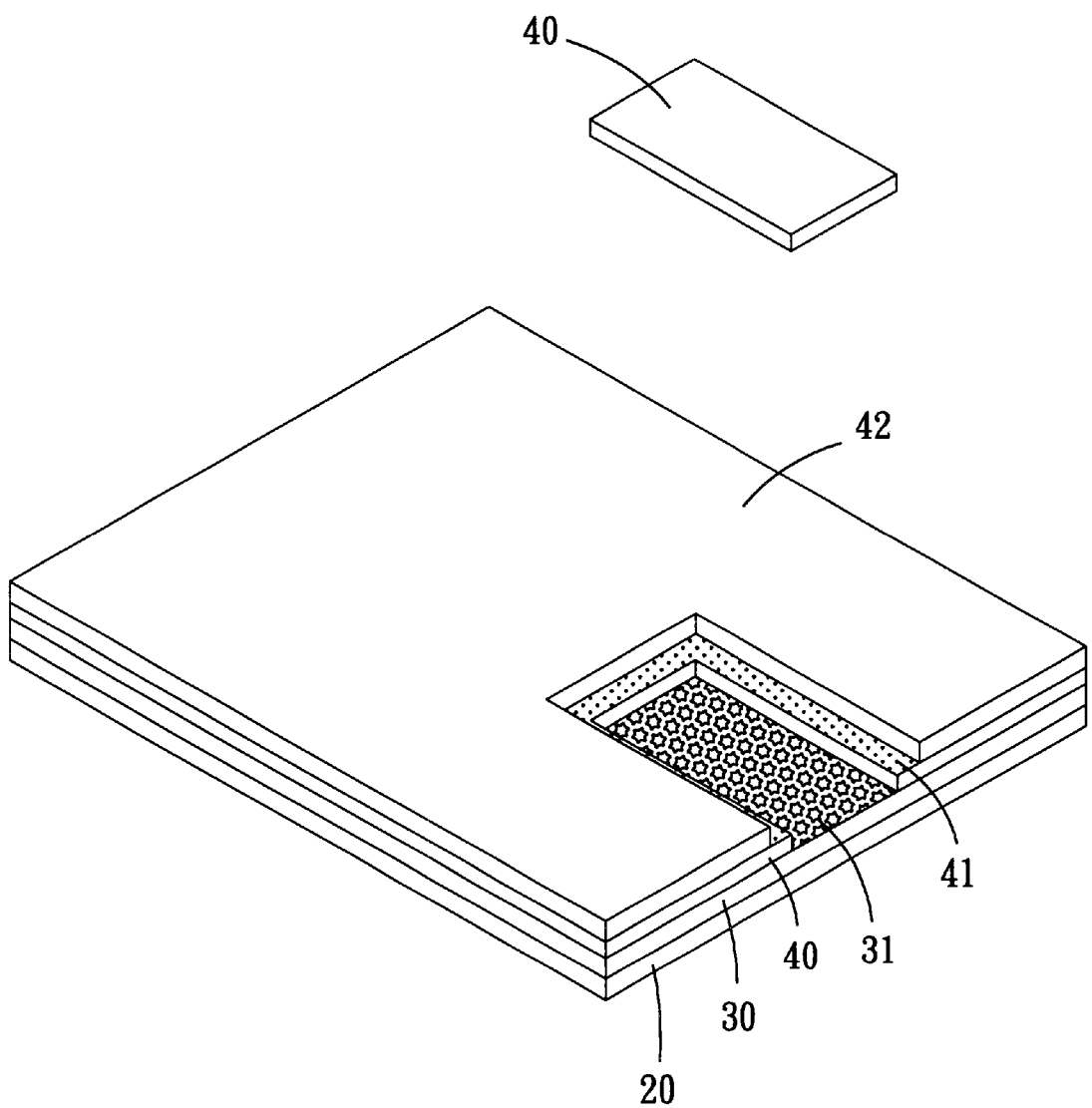
Figure 5C:
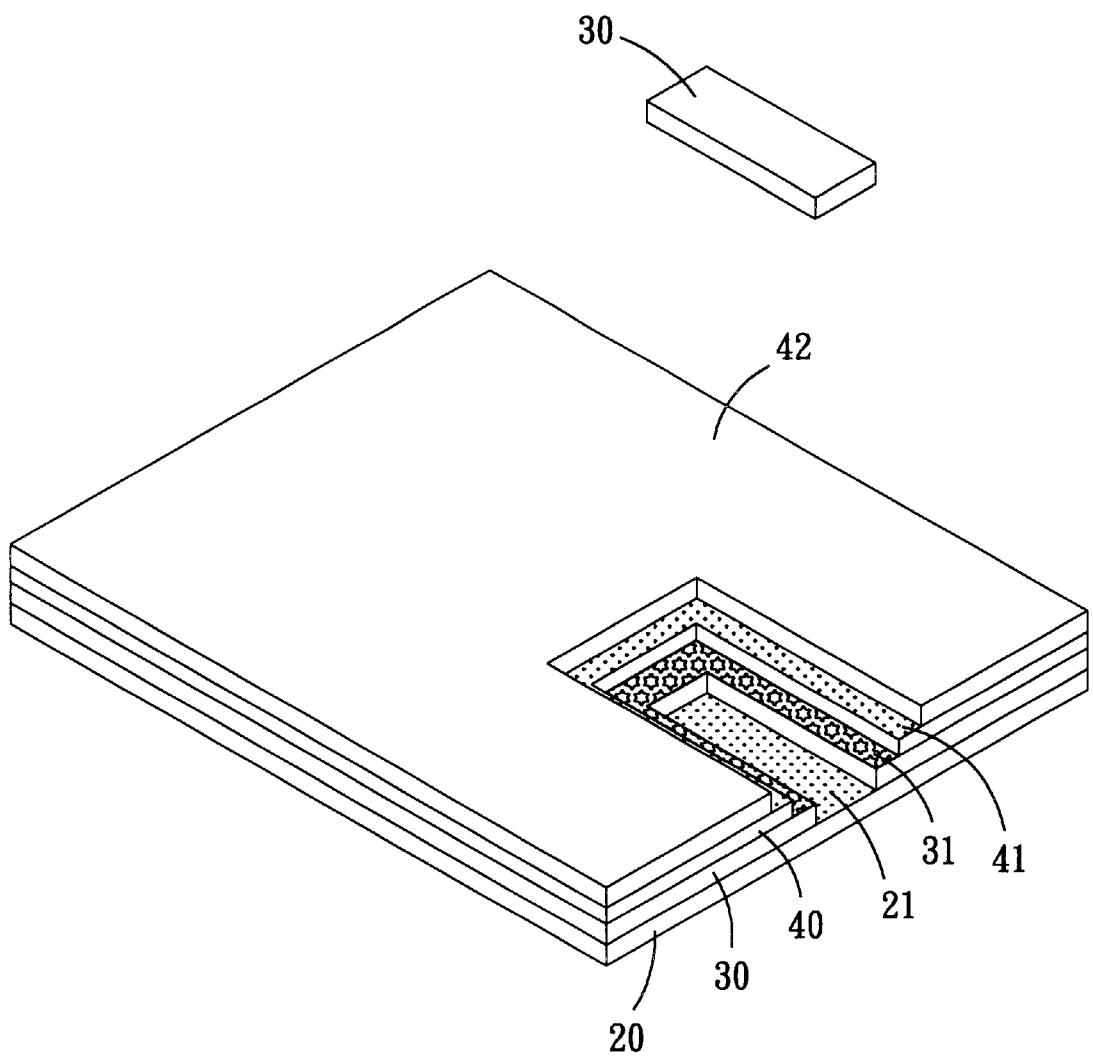

FIGS. 5A–5C show an application of the hologram label 100 constructed in accordance with any of the first to fourth embodiments of the present invention. The protective layer 42 can be removed by a length of an adhesive tape (not shown). The adhesive tape is firmly attached to the protective layer 42 and forcibly pulled to peel the protective layer 42. The third pattern 41 is thus shown and a hologram associated is thus formed (FIG. 5A). By repeating the process, the third layer 40 or 40' can be removed to show the second pattern 31 which forms another hologram (FIG. 5B). Further repeating the process, the second layer 30 or 30' is removed and the first pattern 21, as well as a hologram associated therewith, is shown (FIG. 5C). Thus, the present invention provides a hologram label 100 having a number of hologram layers that can be shown one by one to achieve an excellent anti-counterfeit.

Figure 6A:
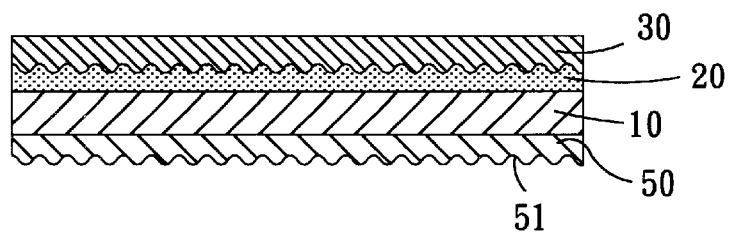
FIGS. 6A–6C respectively show a process for making a multi-layer hologram label in accordance with a fifth embodiment of the present invention and the hologram label so made.
Figure 6B:
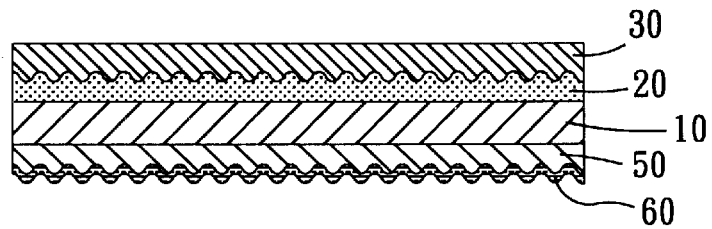
Figure 6C:
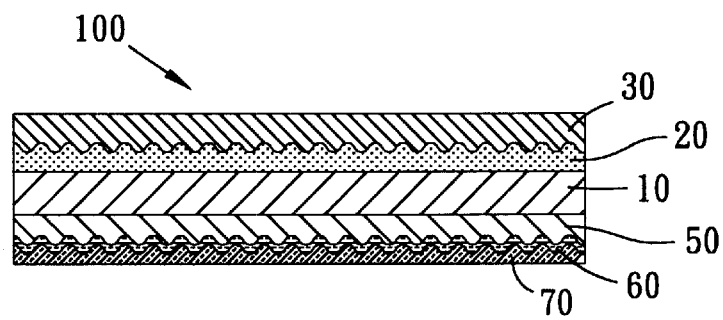

FIGS. 6A–6C shows a multi-layer hologram label constructed in accordance with a fifth embodiment of the present invention, also designated with reference numeral 100 for simplicity. The multi-layer label 100 of the fourth embodiment comprises a base layer 10 having a first surface (not labeled) on which a first layer 20 of adhesive material is coated. A first hologram pattern (not labeled) is formed on the first layer 20. A second layer 30 is coated on the first pattern of the first layer 20. To this point, the multi-layer label 100 of the fifth embodiment is substantially identical to the multi-layer label 100 of the first embodiment. The base layer 10 has a second surface (not labeled) opposite to the first surface. A layer 50 of adhesive material is formed on the second surface of the base layer 10. A fourth pattern 51 is formed on the surface of the layer 50 for the formation of a fourth hologram (FIG. 6A). A layer 60 of metallic material or other materials of high reflectivity is coated on the fourth pattern 51 (FIG. 6B). A protective layer 70 is further formed on the reflective layer 60 (FIG. 6C). Due to the high reflectivity of the reflective layer 60, the fourth hologram of the fourth pattern 51 is still visible. The high reflectivity of the layer 60 functions to enhance the brightness of a holographic image displayed by the hologram label 100.

Figure 7:
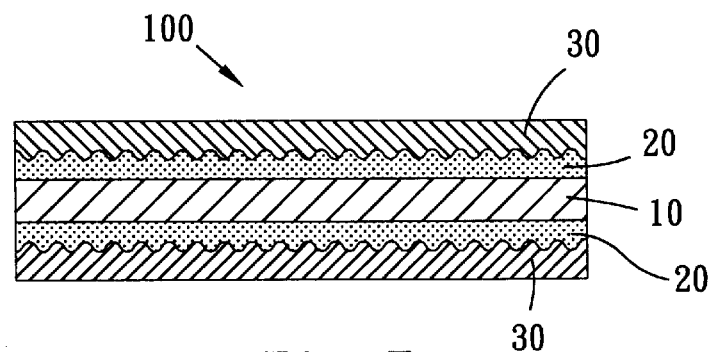
FIG. 7 is a cross-sectional view of a multi-layer hologram label constructed in accordance with a sixth embodiment of the present invention.

FIG. 7 shows a multi-layer hologram label constructed in accordance with a sixth embodiment of the present invention, also designated with reference numeral 100 for simplicity. The multi-layer label 100 of the sixth embodiment comprises a base layer 10 having opposite first and second surfaces (both not labeled), on each of which a first layer 20 of adhesive material is coated. A first pattern (not labeled) associated with a first hologram is formed on the surface of each first layer 20. A second layer 30 of adhesive material is then coated on the first pattern of each first layer 20. Thus, the sixth embodiment of the present invention provides a double-sided, multi-layer hologram label.

Figure 8A:
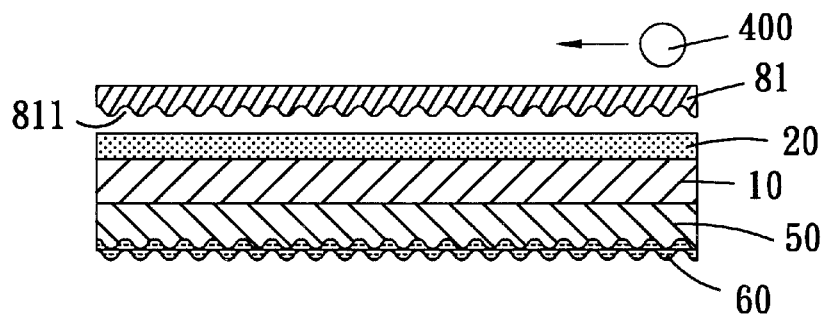
FIGS. 8A–8F respectively show a process for making a multi-layer hologram label in accordance with a seventh embodiment of the present invention and the hologram so made.
Figure 8B:
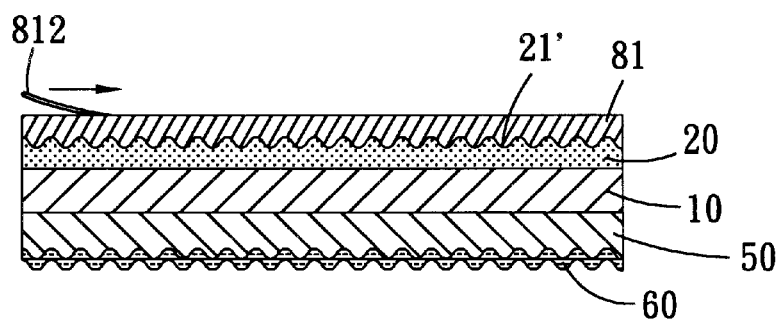
Figure 8C:
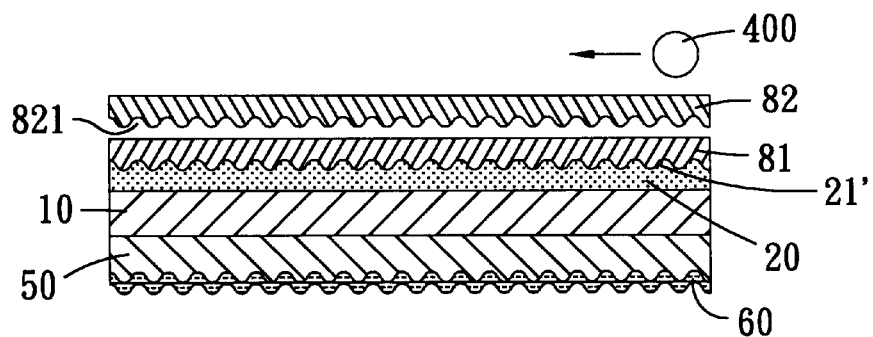
Figure 8D:
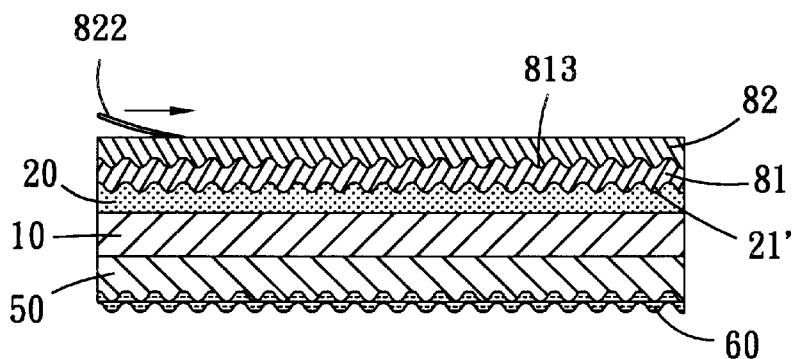
Figure 8E:
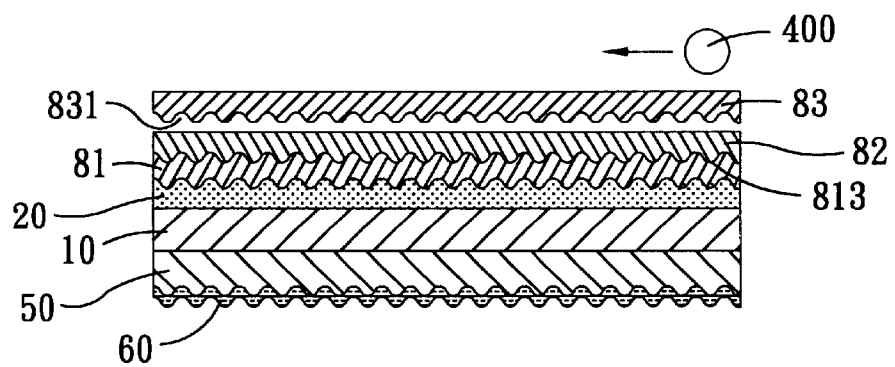
Figure 8F:
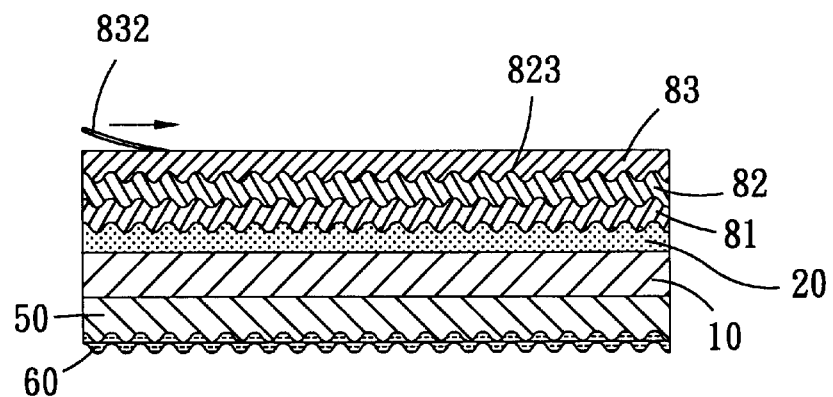

FIGS. 8A–8F shows a multi-layer hologram label constructed in accordance with a seventh embodiment of the present invention, designated with reference numeral 100'. The multi-layer hologram label 100' comprises a base layer 10 having a first surface (not labeled) on which a layer 20 of adhesive material is coated. A first hologram film 81 having first hologram patterning 811 is attached to the layer 20. The first hologram patterning 811 displays a first holographic image. A roller 400 is employed to apply a load to press the first hologram film 81 for forming a corresponding pattern 21' on the layer 20 (FIG. 8A). A skin layer 812 of the first hologram film 81 is then peeled and removed (FIG. 8B). A second hologram film 82 having second hologram patterning 821 associated with a second holographic image that can be different from the first holographic image of the first hologram film 81 is attached to the first hologram film 81 and a roller 400 applies a load to press the second hologram film 82 (FIG. 8C) to form a corresponding pattern 813 on the first hologram film 81. A skin layer 822 of the second hologram film 82 is peeled and removed (FIG. 8D). A third hologram film 83 having third hologram patterning 831 associated with a third holographic image that can be different from the first and second holographic images of the first and second hologram films 81, 82 is attached to the second hologram film 82 and a roller 400 applies a load to press the third hologram film 83 (FIG. 5E) to form a corresponding pattern 823 on the second hologram film 82. A skin layer 832 of the third hologram film 83 is peeled and removed (FIG. 8F). Thus, a multi-layer hologram label comprising three patterns 21', 813, 823 is made.

In accordance with the present invention of the present invention, a layer 50 of adhesive material is coated on a second surface of the base layer 10. A pattern (not labeled) is formed on the surface of the layer 50. A layer of high reflectivity 60 is coated on the pattern of the layer 50 for enhancing the brightness of the holographic image displayed by the label 100'.

Figure 9:
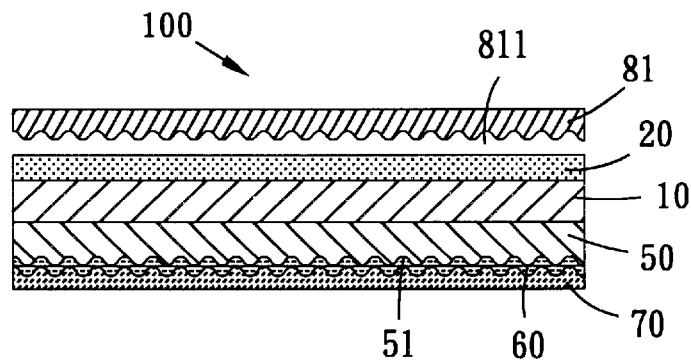
FIG. 9 is a cross-sectional view of a multi-layer hologram label constructed in accordance with an eighth embodiment of the present invention.
Figure 10:
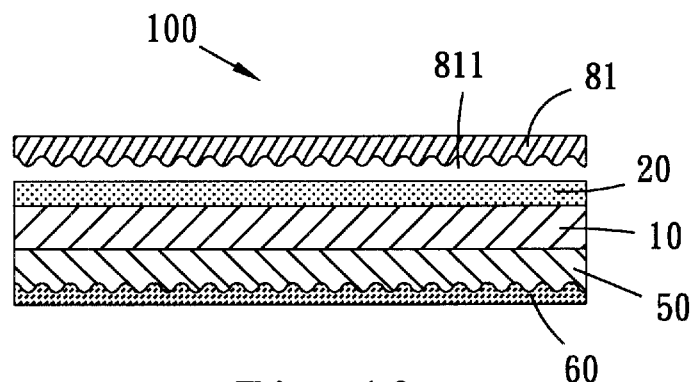
FIG. 10 is a cross-sectional view of a multi-layer hologram label constructed in accordance with a ninth embodiment of the present invention.

FIGS. 9 and 10 respectively show multi-layer hologram labels constructed in accordance with eighth and ninth embodiments of the present invention, both designated with reference numeral 100 for simplicity. The hologram label 100 of the eighth embodiment comprises a base layer 10 having a first surface (not labeled) on which a layer of adhesive layer 20 is coated. A first hologram film 81 having first hologram patterning 811 is pressed onto the surface of the adhesive layer 20. The base layer 10 has a second surface on which a layer 50 of adhesive material is coated. A pattern 51 is formed on the surface of the adhesive layer 50. A high reflectivity layer 60 is coated on the pattern 51 for enhancing brightness of the holographic image displayed by the label 100. A protective layer 70 is formed on the high reflectivity layer 60 for protection.

The ninth embodiment of FIG. 10 is substantially identical to the eighth embodiment of FIG. 9, but the multi-layer hologram label 100 of the ninth embodiment eliminates the high reflectivity layer 60, thus making the holographic image of the ninth embodiment not so bright as that of the eighth embodiment but still observable.

Figure 11:
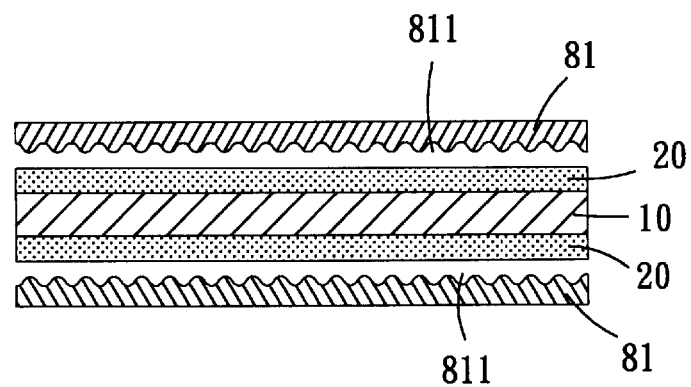
FIG. 11 is a cross-sectional view of a multi-layer hologram label constructed in accordance with a tenth embodiment of the present invention.
Figure 12A:
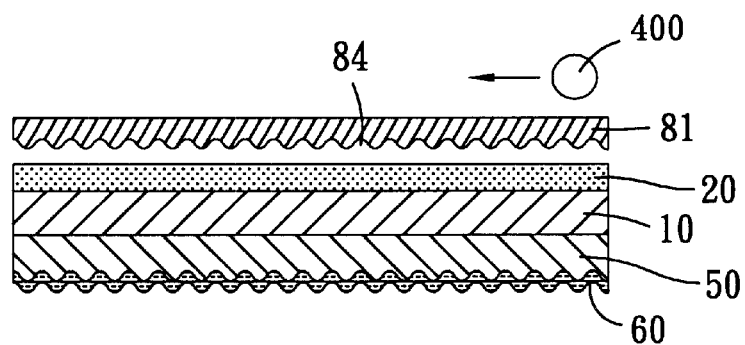
FIGS. 12A–12I respectively show a process for making a multi-layer hologram label in accordance with an eleventh embodiment of the present invention and the hologram so made.
Figure 12B:
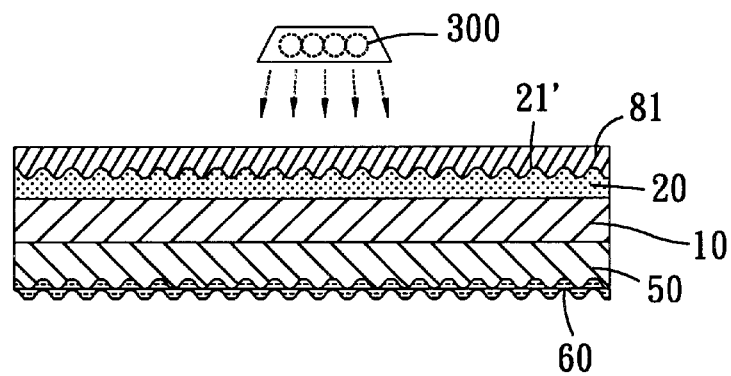
Figure 12C:
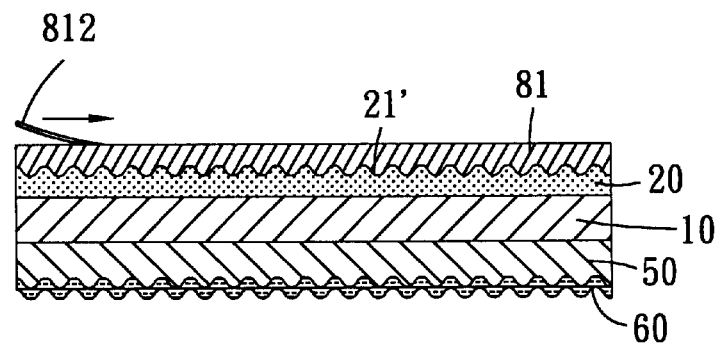
Figure 12D:
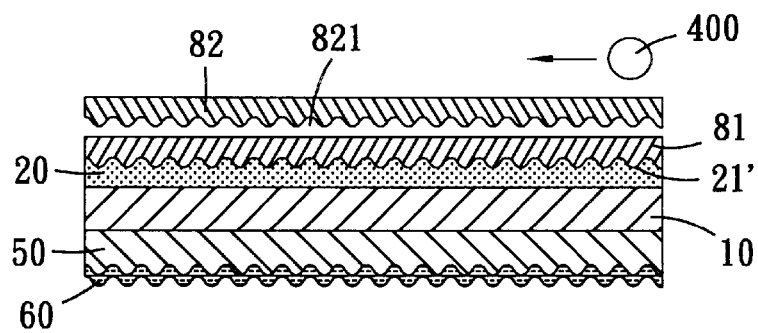
Figure 12E:
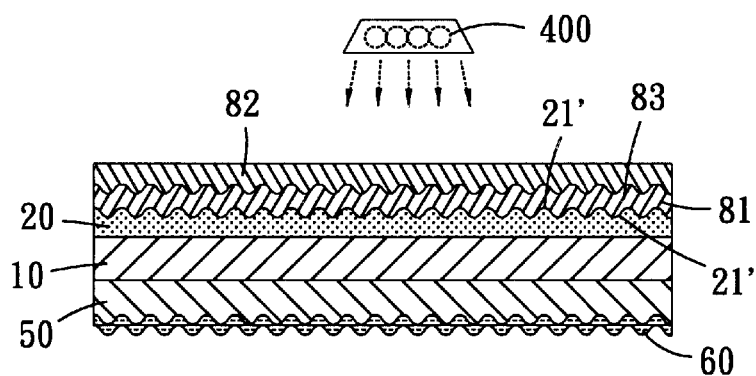
Figure 12F:
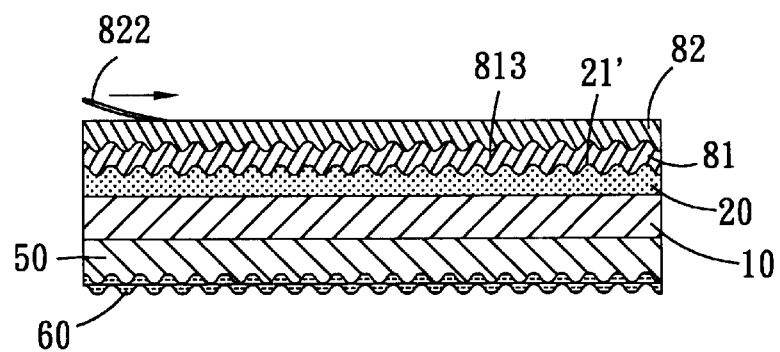
Figure 12G:
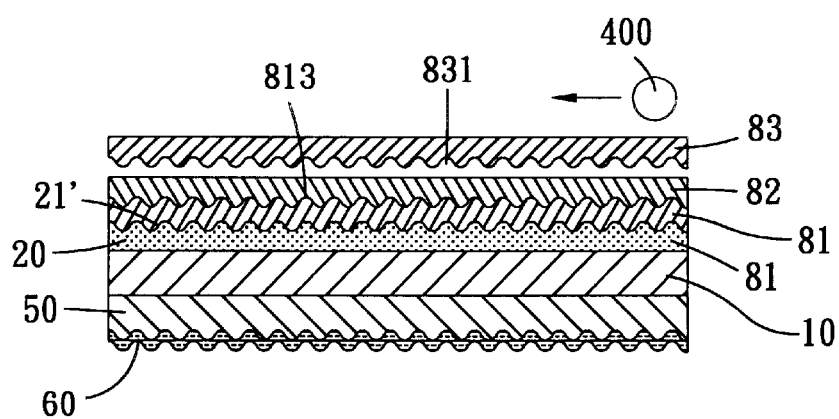
Figure 12H:
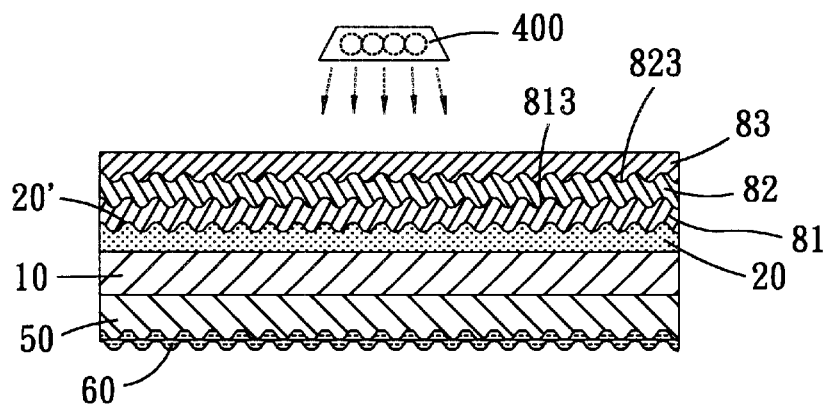
Figure 12I:
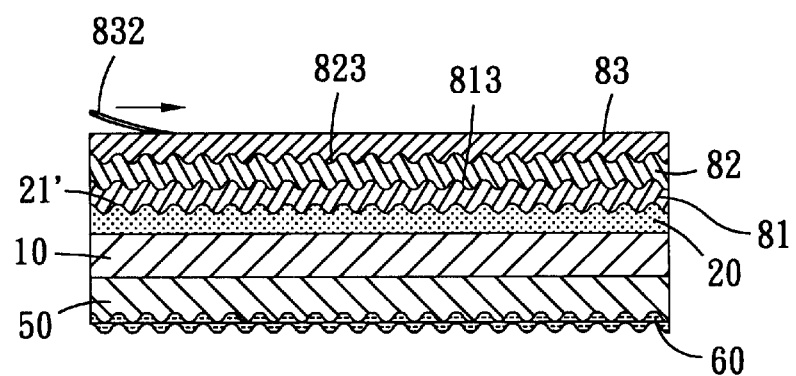

FIG. 11 shows a multi-layer hologram label constructed in accordance with a tenth embodiment of the present invention, comprising a base layer 10 having opposite surfaces (not labeled) on each of which a layer 20 of adhesive material is coated. A hologram film 81 having hologram patterning 811 is attached to each layer 20.

FIGS. 12A–12I shows a multi-layer hologram label constructed in accordance with an eleventh embodiment of the present invention, which is substantially identical to the multi-layer hologram label of the seventh embodiment shown in FIGS. 8A–8F and is thus designated with reference numeral 100' for simplicity. The multi-layer hologram label 100' of the eleventh embodiment is made in substantially the same process as that of the seventh embodiment but the label 100' is exposed to a ultraviolet source 300 each time the roller 400 is employed to press the hologram films 81, 82, 83. This makes the hologram patterning more distinctive and concrete.

Figure 13A:
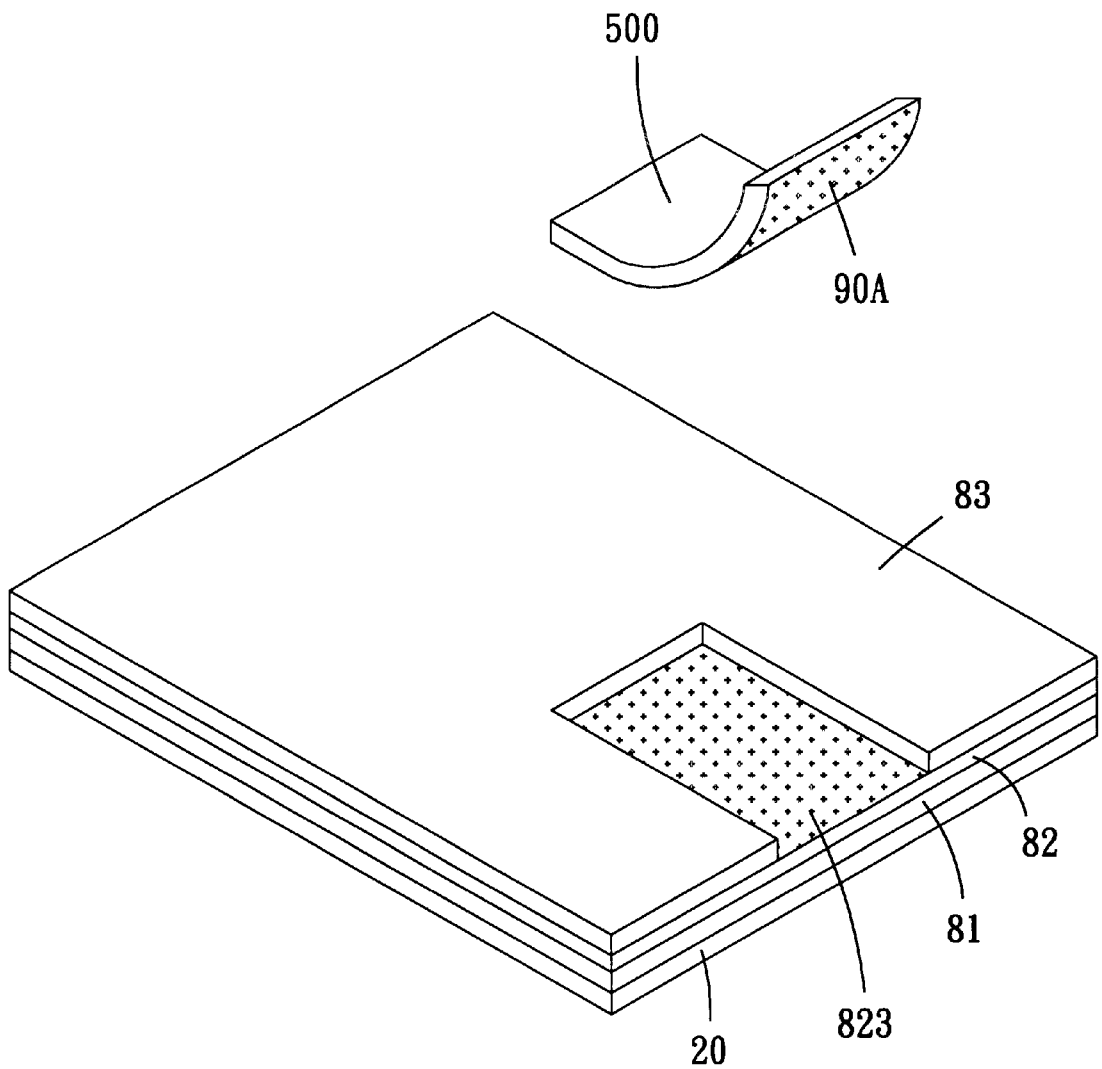
FIGS. 13A–13C are perspective views of a multi-layer hologram label of the seventh and eleventh embodiments of the present invention with different layers being removed sequentially.
Figure 13B:
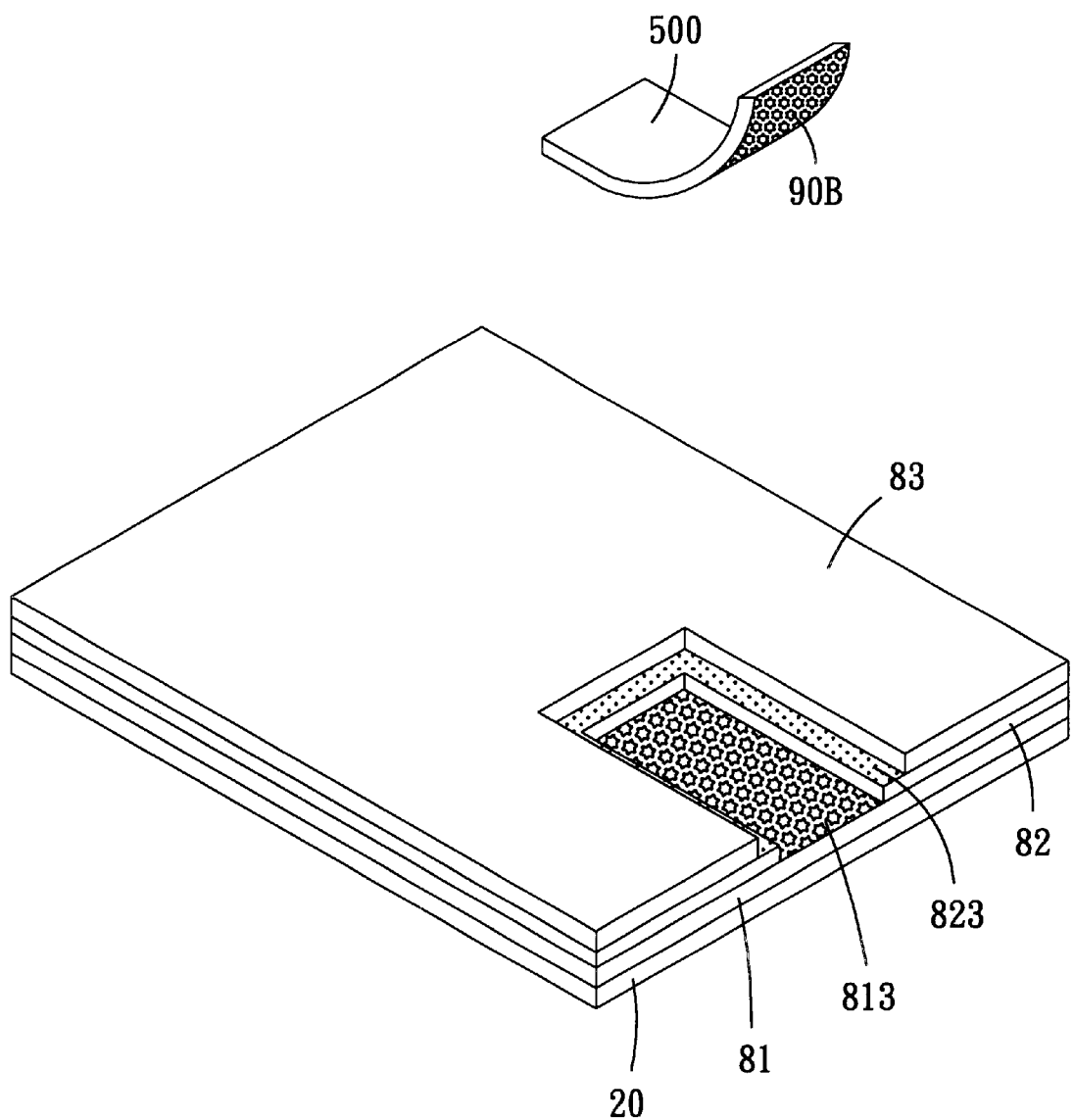
Figure 13C:
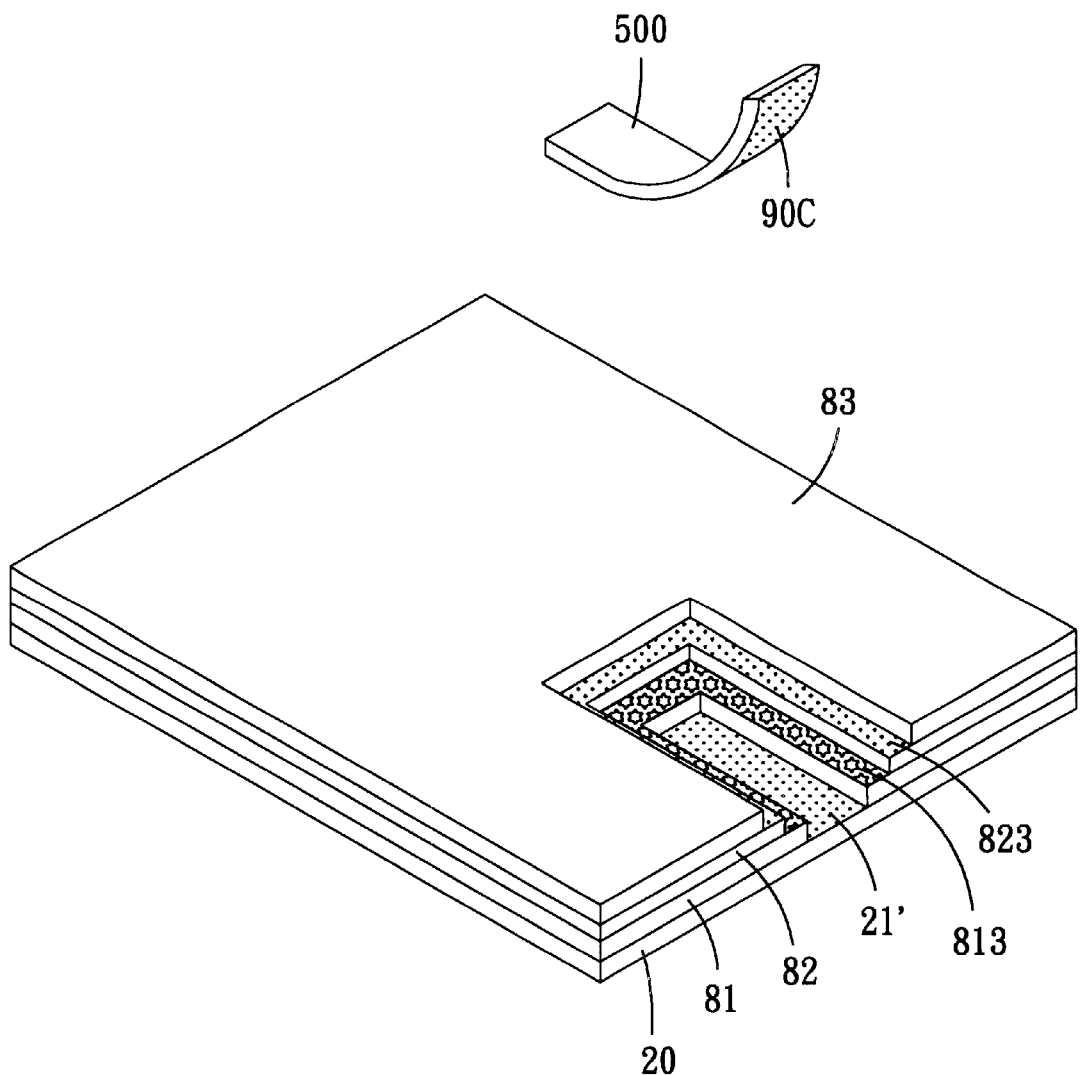

FIGS. 13A–13C show an application of the multi-layer hologram label 100' constructed in accordance with the seventh or eleventh embodiment of the present invention. A length of an adhesive tape 500 is adhered to the third hologram film 83 and forcibly pulled to peel the third hologram film 83 from the label 100'. A hologram 90A is thus formed on the adhesive tape 50 by the third hologram patterning 831 of the third hologram film 83. The pattern 823 formed the second hologram film 82 is also exposed to display an associated holographic image (FIG. 13A). By repeating the process, the second hologram film 82 is moved to the tape 500 and a hologram 90B associated with the second hologram patterning 821 of the second hologram film 82 is formed on the tape 500. The pattern 813 formed on the first hologram film 81 is exposed to display an associated holographic image (FIG. 13B). Further repeating the process, the first hologram film 81 is moved to the tape 500 and a hologram 90C associated with the first hologram patterning 811 of the first hologram film 81 is formed on the tape 500. The pattern 21' formed on the layer 20 is exposed to display an associated holographic image (FIG. 13A). By the repeated removal of the multiplicity of layers from the label 100', a number of different holographic images can be displayed for excellent anti-counterfeit purposes.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A multi-layer hologram label comprising:
   a base layer; wherein
   a first layer of adhesive material is coated on a first surface of the base layer, a first pattern being formed on a surface of the first layer for displaying a first holographic image, a second layer of adhesive material is formed on the first pattern of the first layer in a stacked manner, the second layer having a surface on which a second pattern is formed for formation of a second holographic image, whereby by removing the second layer, the first pattern of the first layer is exposed to display the first holographic image associated therewith; and wherein
   the base layer has a second surface on which a layer of adhesive material is coated, a pattern associated with a holographic image being formed on the layer of adhesive material.

2. The multi-layer hologram label as claimed in claim 1 further comprising a high reflectivity layer coated on the pattern of the layer of adhesive material on the second surface of the base layer.

3. The multi-layer hologram label as claimed in claim 2 further comprising a protective layer coated on the high reflectivity layer.

4. The multi-layer hologram label as claimed in claim 1 further comprising a protective layer coated on the second pattern of the second layer.

5. The multi-layer hologram label as claimed in claim 1, wherein the adhesive material comprises a resin.

6. The multi-layer hologram label as claimed in claim 5, wherein the adhesive material comprises an ultraviolet curable resin.

7. A multi-layer hologram label comprising:

a base layer;

a layer of adhesive material coated on a first surface of the base layer;

a first hologram film having first hologram patterning associated with a first holographic image being forcibly attached to the layer of adhesive material to form a pattern on a surface of the layer of adhesive material, a second hologram film having second hologram patterning associated with a second holographic image being forcibly attached to a surface of the first hologram film to form a pattern on the surface of the first hologram film, whereby by sequentially removing the second and first hologram films, the patterns formed on the first hologram film and the layer of adhesive layer are sequentially exposed to respectively display the holographic images associated therewith.

8. The multi-layer hologram label as claimed in claim 7, wherein the base layer has an opposite second surface on which a layer of adhesive material is coated, a pattern associated with a holographic image being formed on the layer.

9. The multi-layer hologram label as claimed in claim 8 further comprising a high reflectivity layer coated on the pattern of the layer of adhesive material on the second surface of the base layer.

10. The multi-layer hologram label as claimed in claim 9 further comprising a protective layer coated on the high reflectivity layer.

* * * * *